United States Patent [19]

Gutierrez et al.

[11] Patent Number: 4,632,769

[45] Date of Patent: Dec. 30, 1986

[54] ETHYLENE COPOLYMER VISCOSITY INDEX IMPROVER-DISPERSANT ADDITIVE USEFUL IN OIL COMPOSITIONS

[75] Inventors: Antonio Gutierrez, Mercerville; Darrell W. Brownawell; Ricardo Bloch, both of Scotch Plains; Jack E. Johnston, Westfield, all of N.J.

[73] Assignee: Exxon Research & Engineering Co., Florham Park, N.J.

[21] Appl. No.: 679,471

[22] Filed: Dec. 7, 1984

[51] Int. Cl.$^4$ .......................................... C10M 133/16
[52] U.S. Cl. ............................ 252/48.6; 252/51.5 A; 252/56 D; 252/56 R; 525/331.7; 525/331.8
[58] Field of Search .............. 252/51.5 A, 48.6, 56 D, 252/56 R; 525/331.7, 331.8

[56] References Cited

U.S. PATENT DOCUMENTS

| | | | |
|---|---|---|---|
| 3,316,177 | 4/1967 | Dorer, Jr. ............................ | 252/51.5 |
| 3,326,804 | 6/1967 | Shih-en Hu ........................... | 252/34 |
| 4,089,794 | 5/1978 | Engel et al. ........................ | 252/51.5 A |
| 4,089,795 | 5/1978 | Engel et al. ........................ | 252/51.5 A |
| 4,137,185 | 1/1979 | Gardiner et al. ..................... | 252/33 |
| 4,144,181 | 3/1979 | Elliott et al. ...................... | 252/33 |
| 4,160,739 | 7/1979 | Stambaugh et al. ................... | 252/34 |
| 4,161,452 | 7/1979 | Stambaugh et al. ................... | 252/34 |
| 4,174,322 | 11/1979 | Brois et al. ........................ | 548/237 |

FOREIGN PATENT DOCUMENTS 0066953 12/1982 European Pat. Off. .

*Primary Examiner*—Jacqueline V. Howard
*Attorney, Agent, or Firm*—F. T. Johmann; R. A. Maggio

[57] ABSTRACT

Oil soluble viscosity index improving ethylene copolymers, such as copolymers of ethylene and propylene; and ethylene, propylene and diolefin; etc., are reacted or grafted with ethylenically unsaturated carboxylic acid moieties, preferably maleic anhydride moieties, and reacted with polyamines having two or more primary amine groups and a $C_{22}$ to $C_{28}$ olefin carboxylic acid component, preferably alkylene polyamine and alkenyl succinic anhydride, respectively. These reactions can permit the incorporation of varnish inhibition and dispersancy into the ethylene copolymer while inhibiting cross-linking with resulting viscosity increase, haze or gelling. The aforesaid grafting reaction may be carried out thermally, or more preferably with a free radical initiator such as a peroxide in a mineral lubricating oil, in which case the olefin carboxylic acid component, preferably also acts to solubilize insoluble compounds formed by side reactions, such as maleic anhydride grafted oil molecules reacted with amine, to thereby inhibit haze formation, particularly when preparing oil concentrates of the V.I.-dispersant additive for later addition to lubricating oils.

19 Claims, No Drawings

ETHYLENE COPOLYMER VISCOSITY INDEX IMPROVER-DISPERSANT ADDITIVE USEFUL IN OIL COMPOSITIONS

BACKGROUND OF THE INVENTION

1. Field of the Invention

The invention relates to polymeric viscosity index (V.I.) improvers-dispersant additives for petroleum oils, particularly lubricating oils. These additives comprise a copolymer of ethylene with one or more $C_3$ to $C_{28}$ alpha-olefins, preferably propylene, which have been grafted with acid moieties, e.g. maleic anhydride, and then reacted with a $C_{22}$ to $C_{28}$ olefin acid component, and a polyamine having two or more primary amine groups. Or the grafted polymer may be reacted with said $C_{22}$ to $C_{28}$ acid component prereacted with said polyamine to form salts or amides, and then reacted with said grafted olefin polymer. The invention also relates to processes for preparing the preceding products and their use in oil lubricating and fuel compositions.

2. Prior Disclosures

The concept of derivatizing V.I. improving high molecular weight ethylene copolymers, with acid moieties such as maleic anhydride, followed by reaction with an amine to form a V.I.-dispersant oil additive is known in the art. The use of a second acid, e.g. to inactivate primary amine groups, has been found useful as an additional step as indicated by the following patents.

U.S. Pat. No. 4,137,185 teaches reacting $C_1$ to $C_{30}$ monocarboxylic acid anhydrides, and dicarboxylic anhydrides, such as acetic anhydride, succinic anhydride, etc. with an ethylene copolymer reacted with maleic anhydride and a polyalkylene polyamine to inhibit cross linking and viscosity increase due to further reaction of any primary amine groups which were initially unreacted.

U.S. Pat. No. 4,144,181 is similar to U.S. Pat. No. 4,137,185 in that it teaches using a sulfonic acid to inactivate the remaining primary amine groups when a maleic anhydride grafted ethylene-propylene copolymer is reacted with a polyamine.

U.S. Ser. No. 260,883 filed May 6, 1981, now published as European Patent Application 82-302326.2, used hydrocarbyl substituted succinic acid or anhydride, or long chain monocarboxylic acid, together with the polyamine, and maleic anhydride grafted ethylene copolymer.

The early patents such as U.S. Pat. No. 3,316,177 and 3,326,804 taught the general concept of grafting an ethylene-propylene copolymer with maleic anhydride and then reacting with a polyalkylene polyamine, such as polyethylene amines. Subsequently, U.S. Pat. No. 4,089,794 was directed to using an oil solution for free radical peroxide grafting the ethylene copolymer with maleic anydride and then reacting with the polyamine. This concept had the advantage that by using oil, the entire reaction could be carried out in an oil solution to form an oil concentrate, which is the commercial form in which such additives are sold. Subsequently, in operating at higher polyamine levels in order to further increase the dispersing effect, increased problems occurred with the unreacted amine groups cross-linking and thereby causing viscosity increase of the oil concentrate during storage, subsequent formation of haze and in some instances gelling. Even though one or more moles of the ethylene polyamine was used per mole of maleic anhydride during imide formation, cross-linking became more of a problem as the nitrogen content of the polymers was increased. One solution was to use the polyamines and then to react the remaining primary amino groups with the acid anhydride, preferably acetic anhydride of U.S. Pat. No. 4,137,185 or the sulfonic acid of U.S. Pat. No. 4,144,181, or the succinic acids or anhydrides, or mono-acids of Ser. No. 260,883.

Still another problem arose when using free radical initiators with mineral oil as the grafting medium. Here, as the grafting levels were increased to increase the dispersancy level, a larger proportion of the oil molecules in turn became grafted with the maleic anhydride. Then upon subsequent reaction with the amine these grafted oil particles tended to become insoluble and to form haze.

The present invention permits the utilization of the generally less expensive polyalkylene polyamines having two primary amine groups, while achieving good dispersancy levels, inhibiting cross-linking, and if desired, allowing initiator, e.g. peroxide, grafting in oil. A further improvement over the invention of Ser. No. 260,883 (whose disclosure is hereby incorporated in its entirety) is obtained in low temperature viscosity. This is beneficial in making it easier to crank the vehicle engine in cold weather to start the engine. The preceding can be obtained by reacting the polymer grafted with the maleic anhydride with the mono or dicarboxylic olefin acid component of the invention, together with the polyalkylene polyamine, e.g. polyethyleneamine. Cross-linking between ethylene copolymer molecules is reduced or inhibited since many of the polyamine molecules will have one primary group reacted with a maleic anhydride moiety of the ethylene copolymer, while its other primary group is reacted with the olefin acid component. A further advantage if the grafting is carried out in an oil solution, using a free radical initiator, e.g. a peroxide which is generally much faster with better control, than say depending upon thermal cracking or degradation, oil molecules which become grafted with maleic anhydride and react with the amine, will, to a substantial extent, be solubilized.

DESCRIPTION OF PREFERRED EMBODIMENT

Ethylene Copolymer

Oil soluble ethylene copolymers used in the invention generally will have a number average molecular weight ($\overline{M}_n$) of from about 5000 to about 500,000; preferably 10,000 to 200,000 and optimally from about 20,000 to 100,000. In general, polymers useful as V.I. improvers will be used. These V.I. improvers will generally have a narrow range of molecular weight, as determined by the ratio of weight average molecular weight ($\overline{M}_w$) to number average molecular weight ($\overline{M}_n$). Polymers having a $\overline{M}_w/\overline{M}_n$ of less than 10, preferably less than 7, and more preferably 4 or less are most desirable. As used herein ($\overline{M}_n$) and ($\overline{M}_w$) are measured by the well known techniques of vapor phase osmometry (VPO), membrane osmometry and gel permeation chromotography. In general, polymers having a narrow range of molecular weight may be obtained by a choice of synthesis conditions such as choice of principal catalyst and cocatalyst combination, addition of hydrogen during the synthesis, etc. Post synthesis treatment such as extrusion at elevated temperature and under high shear through small orifices, mastication under elevated temperatures, thermal degradation, fractional precipitation from solution, etc. may also be used to obtain narrow ranges of desired molecular weights and to break down higher molecular weight polymer to different molecular weight grades for V.I. use.

These polymers are prepared from ethylene and ethylenically unsaturated hydrocarbons including cyclic, alicyclic and acyclic, containing from 3 to 28 carbons, e.g. 2 to 18 carbons. These ethylene copolymers may contain from 15 to 90 wt. % ethylene, preferably 30 to 80 wt. % of ethylene and 10 to 85 wt. %, preferably 20 to 70 wt. % of one or more $C_3$ to $C_{28}$, preferably $C_3$ to $C_{18}$, more preferably $C_3$ to $C_8$, alpha olefins. While not essential, such copolymers preferably have a degree of crystallinity of less than 25 wt. %, as determined by X-ray and differential scanning calorimetry. Copolymers of ethylene and propylene are most preferred. Other alpha-olefins suitable in place of propylene to form the copolymer, or to be used in combination with ethylene and propylene, to form a terpolymer, tetrapolymer, etc., include 1-butene, 1-pentene, 1-hexene, 1-heptene, 1-octene, 1-nonene, 1-decene, etc.; also branched chain alpha-olefins, such as 4-methyl-1-pentene, 4-methyl-1-hexene, 5-methylpentene-1, 4,4-dimethyl-1-pentene, and 6-methylheptene-1, etc., and mixtures thereof.

The term copolymer as used herein, unless otherwise indicated, includes terpolymers, tetrapolymers, etc., of ethylene, said $C_{3-28}$ alpha-olefin and/or a non-conjugated diolefin or mixtures of such diolefins which may also be used. The amount of the non-conjugated diolefin will generally range from about 0.5 to 20 mole percent, preferably about 1 to about 7 mole percent, based on the total amount of ethylene and alpha-olefin present.

Representative examples of non-conjugated dienes that may be used as the third monomer in the terpolymer include:

a. Straight chain acyclic dienes such as: 1,4-hexadiene; 1,5-heptadiene; 1,6-octadiene.
b. Branched chain acyclic dienes such as: 5-methyl-1,4-hexadiene; 3,7-dimethyl 1,6-octadiene; 3,7-dimethyl 1,7-octadiene; and the mixed isomers of dihydro-myrcene and dihydro-cymene.
c. Single ring alicyclic dienes such as: 1,4-cyclohexadiene; 1,5-cyclooctadiene; 1,5-cyclo-dodecadiene; 4-vinylcyclohexene; 1-allyl, 4-isopropylidene cyclohexane; 3-allyl-cyclopentene; 4-allyl cyclohexene and 1-isopropenyl-4-(4-butenyl) cyclohexane.
d. Multi-single ring alicyclic dienes such as: 4,4'-dicyclopentenyl and 4,4'-dicyclohexenyl dienes.
e. Multi-ring alicyclic fused and bridged ring dienes such as: tetrahydroindene; methyl tetrahydroindene; dicyclopentadiene; bicyclo (2.2.1) hepta 2,5-diene; alkyl, alkenyl, alkylidene, cycloalkenyl and cycloalkylidene norbornenes such as: ethyl norbornene; 5-methylene-6-methyl-2-norbornene; 5-methylene-6, 6-dimethyl-2-norbornene; 5-propenyl-2-norbornene; 5-(3-cyclopentenyl)-2-norbornene and 5-cyclohexylidene-2-norbornene; norbornadiene; etc.

Ethylenically Unsaturated Carboxylic Acid Material

These materials which are grafted (attached) onto the ethylene copolymer contain at least one ethylenic bond and at least one, preferably two, carboxylic acid groups, or an anhydride group, or a polar group which is convertible into said carboxyl groups by oxidation or hydrolysis. Maleic anhydride or a derivative thereof is preferred as it does not appear to homopolymerize appreciably but grafts onto the ethylene copolymer to give two carboxylic acid functionalities. Such preferred materials have the generic formula

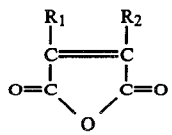

wherein $R_1$ and $R_2$ are hydrogen or a halogen. Suitable examples additionally include chloro-maleic anhydride, itaconic anhydride, or the corresponding dicarboxylic acids, such as maleic acid or fumaric acid or their monoesters, etc.

As taught by U.S. Pat. No. 4,160,739 and U.S. Pat. No. 4,161,452, various unsaturated comonomers may be grafted on the olefin copolymer together with the unsaturated acid component, e.g. maleic anhydride. Such graft monomer systems may comprise one or a mixture of comonomers different from the unsaturated acid component and which contain only one copolymerizable double bond and are copolymerizable with said unsaturated acid component. Typically, such comonomers do not contain free carboxylic acid groups and are esters containing $\alpha, \beta$-ethylenic unsaturation in the acid or alcohol portion; hydrocarbons, both aliphatic and aromatic, containing $\alpha,\beta$-ethylenic unsaturation, such as the $C_4$-$C_{12}$ alpha olefins, for example isobutylene, hexene, nonene, dodecene, etc.; styrenes, for example styrene, $\alpha$-methyl styrene, p-methyl styrene, p-sec. butyl styrene, etc.; and vinyl monomers, for example vinyl acetate, vinyl chloride, vinyl ketones such as methyl and ethyl vinyl ketone, etc. Comonomers containing functional groups which may cause crosslinking, gelation or other interfering reactions should be avoided, although minor amounts of such comonomers (up to about 10% by weight of the comonomer system) often can be tolerated.

Specific useful copolymerizable comonomers include the following:

(A) Esters of saturated acids and unsaturated alcohols wherein the saturated acids may be monobasic or polybasic acids containing up to about 40 carbon atoms such as the following: acetic, propionic, butyric, valeric, caproic, stearic, oxalic, malonic, succinic, glutaric, adipic, pimelic, suberic, azelaic, sebacic, phthalic, isophthalic, terephthalic, hemimellitic, trimellitic, trimesic and the like, including mixtures. The unsaturated alcohols may be monohydroxy or polyhydroxy alcohols and may contain up to about 40 carbon atoms, such as the following: allyl, methallyl, crotyl, 1-chloroallyl, 2-chloroallyl, cinnamyl, vinyl, methyl vinyl, 1-phenallyl, butenyl, propargyl, 1-cyclohexene-3-ol, oleyl, and the like, including mixtures.

(B) Esters of unsaturated monocarboxylic acids containing up to about 12 carbon atoms such as acrylic, methacrylic and crotonic acid, and an esterifying agent containing up to about 50 carbon atoms, selected from saturated alcohols and alcohol epoxides. The saturated alcohols may preferably contain up to about 40 carbon atoms and include monohydroxy compounds such as: methanol, ethanol, propanol, butanol, 2-ethylhexanol, octanol, dodecanol, cyclohexanol, cyclopentanol, neopentyl alcohol, and benzyl alcohol; and alcohol ethers such as the monomethyl or monobutyl ethers of ethylene or propylene glycol, and the like, including mixtures. The alcohol epoxides include fatty alcohol epoxides, glycidol, and various derivatives of alkylene oxides, epichlorohydrin, and the like, including mixtures.

The components of the graft copolymerizable system are used in a ratio of unsaturated acid monomer component to comonomer component of about 1:4 to 4:1, preferably about 12 to 2:1 by weight.

Grafting of the Ethylene Copolymer

The grafting of the ethylene copolymer with the carboxylic acid material may be by any suitable method, such as thermally by the "ene" reaction, using copolymers containing unsaturation, such as ethylene-propylene-diene polymers either chlorinated or unchlorinated, or more preferably it is by free-radical induced grafting, either in bulk without solvent as in an extruder or masticator, or in solvent, preferably in a mineral lubricating oil as solvent.

The radical grafting is preferably carried out using free radical initiators such as peroxides, hydroperoxides, and azo compounds and preferably those which have a boiling point greater than about 100° C. and which decompose thermally within the grafting temperature range to provide said free radicals. Representative of these free-radical initiators are azobutyro-nitrile, 2,5-dimethyl-hex-3-yne-2, 5 bis-tertiary-butyl peroxide (sold as Lupersol 130) or its hexane analogue, di-tertiary butyl peroxide and dicumyl peroxide. The initiator is generally used at a level of between about 0.005% and about 1%, based on the total weight of the polymer solution, and at temperatures of about 150° to 220° C.

The ethylenically unsaturated carboxylic acid material, preferably maleic anhydride, will be generally used in an amount ranging from about 0.01% to about 10%, preferably 0.1 to 2.0%, based on weight of the initial total solution. The aforesaid carboxylic acid material and free radical initiator are generally used in a weight ratio range of about 1.0:1 to 30:1, preferably 3.0:1 to 6:1.

The initiator grafting is preferably carried out in an inert atmosphere, such as that obtained by nitrogen blanketing. While the grafting can be carried out in the presence of air, the yield of the desired graft polymer is generally thereby decreased as compared to grafting under an inert atmosphere substantially free of oxygen. The grafting time will usually range from about 0.1 to 12 hours, preferably from about 0.5 to 6 hours, more preferably 0.5 to 3 hours. The graft reaction will be usually carried out to at least approximately 4 times, preferably at least about 6 times the half-life of the free-radical initiator at the reaction temperature employed, e.g. with 2,5-dimethyl hex-3-yne-2, 5-bis(t-butyl peroxide) 2 hours at 160° C. and one hour at 170° C., etc.

In the grafting process, usually the copolymer solution is first heated to grafting temperature and thereafter said unsaturated carboxylic acid material and initiator are added with agitation, although they could have been added prior to heating. When the reaction is complete, the excess acid material can be eliminated by an inert gas purge, e.g. nitrogen sparging. Preferably the carboxylic acid material that is added is kept below its solubility limit in the polymer solution, e.g. below about 1 wt. %, preferably below 0.4 wt. % or less, of free maleic anhydride based on the total weight of polymer-solvent solution, e.g. ethylene copolymer-mineral lubricating oil solution. Continuous or periodic addition of the carboxylic acid material along with an appropriate portion of initiator, during the course of the reaction, can be utilized to maintain the carboxylic acid below its solubility limits, while still obtaining the desired degree of total grafting.

In the initiator grafting step the maleic anhydride or other carboxylic acid material used will be grafted onto both the polymer and the solvent for the reaction. Many solvents such as dichlorobenzene are relatively inert and may be only slightly grafted, while mineral oil will tend to be more grafted. The exact split of graft between the substrate present depends upon the polymer and its reactivity, the reactivity and type of oil, the concentration of the polymer in the oil, and also upon the maintenance of the carboxylic acid material in solution during the course of the reaction and minimizing the presence of dispersed, but undissolved acid, e.g. the maleic anhydride. The undissolved acid material appears to have an increased tendency to react to form oil insoluble materials as opposed to dissolved acid material. The split between grafted oil and grafted polymer may be measured empirically from the infrared analyses of the product dialyzed into oil and polymer fractions.

The grafting is preferably carried out in a mineral lubricating oil which need not be removed after the grafting step but can be used as the solvent in the subsequent reaction of the graft polymer with the amine material and as a solvent for the end product to form the lubricating additive concentrate. The oil having attached, grafted carboxyl groups, when reacted with the amine material will also be converted to the corresponding derivatives.

The solution grafting step when carried out in the presence of a high temperature decomposable peroxide can be accomplished without substantial degradation of the chain length (molecular weight) of the ethylene-containing polymer. This can be an advantage as opposed to high temperature thermal reactions which depend on degradation to apparently form free radical reactive sites. Measurement of molecular weights and degradation can be evaluated by determination of the Thickening Efficiency (T.E.) of the polymer as will later be described.

The Amines

The amine component will have two or more primary amine groups, wherein the primary amine groups may be unreacted, or wherein one of the amine groups may already be reacted.

Particularly preferred amine compounds have the following formulas:

(A) alkylene polyamines

wherein x is an integer of about 1 to 10, preferably about 2 to 7, and the alkylene radical is a straight or branched chain alkylene radical having 2 to 7, preferably about 2 to 4 carbon atoms;

(B) polyoxyalkylene polyamines

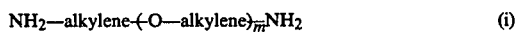

NH$_2$—alkylene-(O—alkylene)$_m$NH$_2$   (i)

where m has a value of about 3 to 70 and preferably 10 to 35; and

R-(alkylene-(-O—alkylene)$_{\overline{n}}$NH$_2$)$_{3-6}$  (ii)

where n has a value of about 1 to 40 with the provision that the sum of all the n's is from about 3 to about 70 and preferably from about 6 to about 35 and R is a polyvalent saturated hydrocarbon radical of up to ten carbon atoms having a valence of 3 to 6. The alkylene groups in either formula (i) or (ii) may be straight or branched chains containing about 2 to 7, and preferably about 2 to 4 carbon atoms.

Examples of the alkylene polyamines of formula (A) above include methylene amines, ethylene amines, butylene amines, propylene amines, pentylene amines, hexylene amines, heptylene amines, octylene amines, other polymethylene amines, the cyclic and higher homologs of these amines such as the piperazines, the amino-alkyl-substituted piperazines, etc. These amines include, for example, ethylene diamine, diethylene triamine, triethylene tetramine, propylene diamine, di(-heptamethylene) triamine, tripropylene tetramine, tetraethylene pentamine, trimethylene diamine, pentaethylene hexamine, di(trimethylene) triamine, 2-heptyl-3-(2-aminopropyl) imidazoline, 4-methylimidazoline, 1,3-bis-(2-aminoethyl) imidazoline, pyrimidine, 1-(2-aminopropyl) piperazine, 1,4-bis-(2-aminoethyl) piperazine, N,N-dimethylaminopropyl amine, N,N-dioctylethyl amine, N-octyl-N'-methylethylene diamine, 2-methyl-1-(2-aminobutyl) piperazine, etc. Other higher homologs which may be used can be obtained by condensing two or more of the above-mentioned alkylene amines in a known manner.

The ethylene amines which are particularly useful are described, for example, in the Encyclopedia of Chemical Technology under the heading of "Ethylene Amines" (Kirk and Othmer), Volume 5, pgs. 898–905; Interscience Publishers, New York (1950). These compounds are prepared by the reaction of an alkylene chloride with ammonia. This results in the production of a complex mixture of alkylene amines, including cyclic condensation products such as piperazines. While mixtures of these amines may be used for purposes of this invention, it is obvious that pure alkylene amines may be used with complete satisfaction.

The polyoxyalkylene polyamines of formula (B) above, preferably polyoxyalkylene diamines and polyoxyalkylene triamines, may have average molecular weights ranging from about 200 to about 4000 and preferably from about 400 to about 2000. The preferred polyoxyalkylene polyamines include the polyoxyethylene and polyoxypropylene diamines and the polyoxypropylene triamines having average molecular weights ranging from about 200 to 2000. The polyoxyalkylene polyamines are commercially available and may be obtained, for example, from the Jefferson Chemical Company, Inc. under the trade name "Jeffamines D-230, D-400, D-1000, D-2000, T-403", etc.

The Olefin Acid Component

The olefin acid component includes mono and dicarboxylic acid or anhydride of the formula RX where R is a hydrocarbyl group containing a total of 22 to 28, preferably 24 to 28, carbons, which are essentially aliphatic, saturated or unsaturated, and include alkenyl and alkyl groups, and can be straight chain or branched. The radical X will usually contain 2 to 10 carbon atoms and will define a mono or dicarboxylic acid, or anhydride. The X radical may be linked to the R group by a carbon or sulfur linkage. Some specific examples of X include the following radicals:

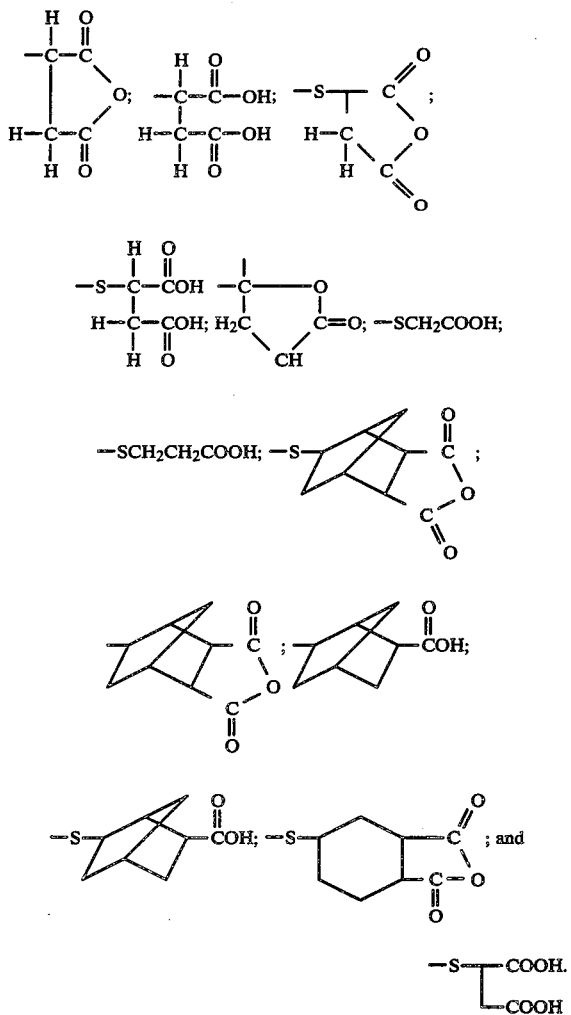

Especially preferred olefin acid components will include:

(a) succinic acid anhydrides and acids of the formula

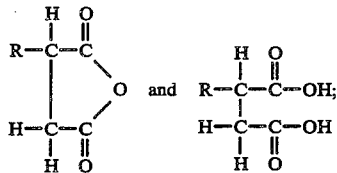

(b) monolactone derivatives of (a), of the formula:

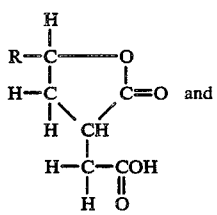

(c) thio monocarboxylic acids of the formula:

$$R-S(CH_2)_nCOOH;$$

wherein R of (a), (b) and (c) represents a $C_{22}$ to $C_{28}$, e.g. $C_{24}$ to $C_{28}$ alkyl or alkenyl group, derived from an alpha olefin, and n is 1 to 3.

Acid materials of the above types and methods for their production are well known. Alkenyl substituted anhydrides or acids can be made by reaction of the $C_{22}$ to $C_{28}$ alpha mono-olefin, or chlorinated mono-olefin, with maleic anhydride, e.g. see said European application 82-302326.2. Hydrogenation can give the corresponding alkyl derivative. Lactone derivatives are described in detail in U.S. Pat. No. 4,174,322 and usually involve heating the alkenyl succinic anhydride with an acid type catalyst in the presence of water. Thio monocarboxylic acid can be readily prepared by conventional reaction of said $C_{22}$ to $C_{28}$ mono-olefin with a thio monocarboxylic acid such as thioacetic acid, etc.

Pre-Reacted Amine-Olefin Acid Component

The aforesaid amine and olefin acid component may be prereacted, with the olefin acid being generally attached to the amine through salt, amide, amidine, or other linkages so that a primary amine group of the polyamine is still available for reaction with the acid moieties of the grafted polymer.

Reaction, preferably amination and/or imidation of the olefin acid is usefully done as a solution reaction with the acid dissolved in a solvent such as mineral oil, to which the amine is added, using from about 0.5 to 3.3, preferably about 0.7 to 1.3, most preferably about 1 molar proportions of the alkylene polyamine per molar proportion of olefin acid to said solution and heating the mixture at 140° C. to 165° C. or higher until the appropriate amount of water of reaction is evolved.

Reaction of Grafted Ethylene Copolymer with Amine and Olefin Acid Component

The grafted polymer, preferably in solution generally equal to about 5 to 30 wt. %, preferably 10 to 20 wt. % polymer, can be readily reacted with a mixture of amine and olefin acid components, or with said pre-reacted amine and olefin acid, by admixture together with said grafted polymer and heating at a temperature of from about 100° C. to 250° C., preferably from 170° to 230° C., for from about 1 to 10 hours, usually about 2 to about 6 hours. The heating is preferably carried out to favor formation of imides rather than amides and salts. Thus, imide formation will give a lower viscosity of the reaction mixture than amide formation and particularly lower than salt formation. This lower viscosity permits the utilization of a higher concentration of grafted ethylene copolymer in the reaction mixture. Removal of water assures completion of the imidation reaction. Reaction ratios can vary considerably, depending upon the reactants, amounts of excess, type of bonds formed, etc. Generally from about 1 to 2, preferably about 1 mole of said bi-primary amine, and about 0.1 to 4, preferably about 0.1 to 3, most preferably about 1 mole equivalent of said olefin acid component, is preferably used, per mole of the grafted dicarboxylic acid moiety content, e.g. grafted maleic anhydride content. Alternatively, if pre-reacted amine and olefin acid component is used, sufficient pre-reacted material is used to give about 1 to 2 primary amine groups per dicarboxylic acid moiety in the grafted polymer, depending on whether primarily imides or amides are formed. Usually 1 to 2 moles of said pre-reacted material is used per molar amount of said dicarboxylic acid moieties in the grafted polymer. For example, with an ethylene-propylene copolymer of about 40,000 ($\overline{M}_n$), i.e. a thickening efficiency of about 2.1, and averaging 4 maleic anhydride groups per molecule, and making imides, about 4 moles of amine with two primary groups and about 4 moles of olefin carboxylic acid component would preferably be used per mole of grafted copolymer.

Compositions

A minor amount. e.g. 0.001 up to 50 wt. %, preferably 0.005 to 25 wt. %, based on the weight of the total composition, of the oil-soluble nitrogen-containing graft ethylene copolymers produced in accordance with this invention can be incorporated into a major amount of an oleaginous material, such as a lubricating oil or hydrocarbon fuel, depending upon whether one is forming finished products or additive concentrates. When used in lubricating oil compositions, e.g., automotive or diesel crankcase lubricating oil, the nitrogen-containing grafted polymer concentrations are usually within the range of about 0.01 to 10 wt. %, e.g., 0.1 to 6.0 wt. %, preferably 0.25 to 3.0 wt. %, of the total composition. The lubricating oils to which the products of this invention can be added include not only hydrocarbon oil derived from petroleum, but also include synthetic lubricating oils such as esters of dibasic acids; complex esters made by esterifications of monobasic acids, polyglycols, dibasic acids and alcohols; polyolefin oils, etc.

The nitrogen-containing graft polymers of the invention may be utilized in a concentrate form, e.g., from about 5 wt. % up to about 50 wt. %, preferably 7 to 25 wt. %, in oil, e.g., mineral lubricating oil, for ease of handling, and may be prepared in this form by carrying out the reaction of the invention in oil as previously discussed.

The above oil compositions may contain other conventional additives, such as dyes, pour point depressants, antiwear agents, antioxidants, other viscosity-index improvers, dispersants, etc.

The following examples, which include preferred embodiments and wherein all parts are by weight unless otherwise indicated, further illustrate the present invention.

EXAMPLE 1

Part A

Ethylene-propylene (EP) copolymer was grafted with maleic anhydride (MA) in an oil solution in a Reactor which was a small heated kettle equipped with a charging line, stirrer, overhead water condenser, vacuum pump and a nitrogen inlet for maintaining a nitrogen atmosphere. The kettle was charged initially with 40 pounds of ethylene-propylene polymer and 160 pounds of a Solvent 130 Neutral low pour mineral lubricating oil having a viscosity of about 130 SUS at 37.8° C., followed by heating to about 190° C., while stirring and maintaining under vacuum for several hours to dissolve the polymer and to remove moisture. Then 2.25 pounds of maleic anhydride and 0.56 pounds of ditertiary butyl peroxide as a free radical initiator were each added in four separate equal additions over a total period of about 1 hour. After the last of the anhydride and peroxide were added, heating at 190° C. and nitrogen sparge were maintained for a period of about 1½ additional hours. The reactor was then cooled to give an oil solution of the grafted polymer, namely the ethylene-propylene copolymer with succinic anhydride moieties (EPSA) having an acidity equivalent to about 0.1 meq./gram of said oil solution of grafted polymer.

The ethylene-propylene copolymer used above was a V.I. improver for lubricating oil and consisted of about 43 wt. % ethylene and about 57 weight % propylene. It had a Thickening Efficiency of about 1.36 which represents a weight average molecular weight of approximately 80,000. It was an amorphous copolymer with a $\overline{M}_w/\overline{M}_n$ of less than 3.

Thickening Efficiency (T.E.) is defined as the ratio of the weight percent of a polyisobutylene (sold as an oil solution by Exxon Chemical Co. as Paratone N), having a Staudinger Molecular Weight of 20,000, required to thicken a solvent-extracted neutral mineral lubricating oil, having a viscosity of 150 SUS at 37.8° C., a viscosity index of 105 and an ASTM pour point of 0° F., (Solvent 150 Neutral) to a viscosity of 12.4 centistokes at 98.9° C., to the weight percent of a test copolymer required to thicken the same oil to the same viscosity at the same temperature. T.E. is related to ($\overline{M}_w$) and is a convenient, useful measurement for formulation of lubricating oils of various grades.

Part B

Specifically, 800 grams of the oil solution of Part A containing maleic anhydride grafted ethylene-propylene copolymer is heated to 170° C. in a reaction flask while nitrogen blowing to dry the material. Then 33.9 grams of $C_{24}$-$C_{28}$ olefin succinic anhydride was added while stirring, followed by the addition over a ½ hr. period of 7.74 grams diethylene triamine (DETA), all the while maintaining the temperature at 190° C. with the nitrogen stripping. Stripping was then continued for 45 minutes at 190° C. to remove water, and 22.32 g. of a sulfonic acid concentrate was added, while heating for about another 15 minutes after which the heat was turned off. Then 269.3 g. of Solvent 130 Neutral Low Pour (S130NLP) oil was added to the kettle while stirring for about a ½ hour period. After the temperature in the flask had fallen below 140° C., the flask was then drained to give the product.

The $C_{24-28}$ olefin succinic anhydride utilized above was prepared from a mixture of $C_{24-28}$ alpha olefin (Gulftene 24-28) having a typical wt. % distribution as follows: 1%—$C_{22}$; 30%—$C_{24}$; 39%—$C_{26}$; 20%—$C_{28}$ and 10% of $C_{30}$ and higher. About 650 g. (1.786 mole) of said $C_{24-28}$-alpha olefin, 260 g. of maleic anhydride (2.65 mole) and 1 g. of hydroquinone were mixed in a reaction flask and slowly heated to 230° C. It took about 2 hours to reach the desired temperature. The reaction mixture was kept at 230° C. for 2 additional hours and then nitrogen stripped for one-half hour. The infrared spectrum of the stripped product showed the absence of free maleic anhydride. It analyzed for a saponification number of 262.2 and an active ingredient of 97.8 wt. %.

The sulfonic acid concentrate was a 50 wt. % solution of a $C_{24}$ average alkyl benzene sulfonic acid having a number average molecular weight of about 500 in 50 wt. % mineral oil diluent. This material was added as a further stabilizing additive to react with any remaining primary amine groups, in accord with the teaching of U.S. Pat. No. 4,144,181.

Part C

Comparison A

A material representative of the invention of Ser. No. 260,883 was used as a comparison. Here, 800 grams of oil solution of maleic anhydride grafted ethylene-propylene copolymer prepared similarly to Part A was reacted with 7.74 g. diethylene triamine and 81.5 g. polyisobutenyl succinic anhydride (PIBSA) in the same manner as in Part B except the 81.5 g. of PIBSA replaced the 33.9 g. of the $C_{24-28}$ succinic anhydride on an equal molar basic. The PIBSA had a polyisobutenyl group having a number average molecular weight of about 900 and an ASTM Saponification No. of 112.

For each molar amount of maleic anhydride there was used 0.9 moles of DETA and 0.9 moles of PIBSA. The product contained about 0.28 wt. % nitrogen and about 14.1 wt. % of the ethylene-propylene copolymer of a starting T.E. of about 1.2.

Preparation of Concentrates and Blends

Concentrate 1 was formed by mixing 86.5 wt. % of the product of Part B with 13.5 wt. % of S130NLP lubricating oil, to give a concentrate having a viscosity at 100° C. of 628 centistokes (cST).

Blend 1 was prepared by mixing 20 wt. % of Concentrate 1 with 80 wt. % of Enjay 102 which is a mineral lubricating oil which is a blended basestock with a kinematic viscosity of 6.04 Cst at 100° C.

Concentrate 2 was formed by mixing 87.8 wt. % of the product of Part C with 12.2 wt. % of S130NLP lubricating oil.

Blend 2 was formed by mixing 20 wt. % of Concentrate 2 with 80 wt. % Enjay 102.

Blends 1 and 2 were measured for kinetic viscosity (KV) at 100° C., and were also tested for cold cranking characteristics in a Cold Cranking Stimulator as follows:

Cold Cranking Stimulator (CCS)

The cold cranking properties were determined in a high shear Cold Cranking Stimulator (CCS) according to ASTM-D-2607-72 method at $-18°$ C. for viscosity in centipoises.

K.O. Shear Stability Test

The same blends used for CCS were also tested in the shear breakdown test known as Kurt Ohrbahn. This test is described in CEC method L-14 T-74.

The shear stability index is calculated as follows:

$$\text{Shear Stability Index} = \frac{\text{corrected viscosity loss} \times 100}{\text{fresh oil viscosity} - \text{oil viscosity without polymer.}}$$

The viscosities were measured at 100° C. and the approximate viscosity of the fresh oil was 20 Cs. The Shear Stability Index is reported as a %.

The products, their composition and viscosity properties are summarized in Table I.

TABLE I

| | Example I | |
|---|---|---|
| Components, parts by weight | Part B | Part C (Comparison A) |
| EPSA in oil | 800 | 800 |
| Diethylene triamine | 7.74 | 7.74 |
| $C_{24-28}$ succinic acid | 33.9 | — |

TABLE I-continued

| Components, parts by weight | Example I Part B | Part C (Comparison A) |
|---|---|---|
| PIBSA-112 | — | 81.5 |
| Sulfonic Acid Concentrate | 22.32 | 22.32 |
| S130 NLP | 269.3 | 221.6 |

| Concentrates | 1 | 2 |
|---|---|---|
| Example I, Part B | 87.8 | — |
| Example I, Part C | — | 86.5 |
| S130 NLP | 12.2 | 13.5 |

| Blends | 1 | 2 |
|---|---|---|
| Concentrate 1 | 20 | — |
| Concentrate 2 | — | 20 |
| Enjay 102 | 80 | 80 |
| KV @ 100° C., cSt | 20.25 | 20.92 |
| CCS @ −18° C., cp | 3630 | 3880 |
| K.O., % | 26.6 | 22.3 |

As seen by Table I, Blend 1, which contains product of the invention, gave the more desirable cold cranking viscosity of 3630 centipoise at −18° C., which was 200 cp lower than Blend 2, even though the kinetic viscosity of Blend 2 of 20.92 was higher than that of the comparison Blend 2.

EXAMPLE 2

Part A

In this example an oil solution of a 1.4 T.E. ethylene-propylene (EP) copolymer grafted with maleic anhydride to form ethylene-propylene succinic anhydride (EPSA) at a level of 0.105 meq./gram was prepared as follows. Essentially the process of Example 1, Part A was followed except that 20 parts by weight of the ethylene-propylene copolymer (43 wt. % ethylene and about 57 wt. % propylene) was dissolved in 80 parts of Solvent 130 Neutral low pour point lubricating oil and then grafted with 1.07 parts of maleic anhydride using 0.27 parts of tertiary butyl peroxide by using 4 equally divided additions of said anhydride and peroxide at a temperature of about 190° C.

Part B

Following the general procedure of Example 1, Part B, except no sulfonic acid concentrate was used, 800 grams of the oil solution of said ethylene-propylene maleic anhydride grafted copolymer of Part A was heated to 190° C., while stripping with nitrogen to dry the material. Then 33.4 g. of the aforedescribed $C_{24-28}$ olefin succinic anhydride was added to the reaction mixture and DETA was then added over about a ½ hour period with nitrogen stripping, followed by further stripping for about 45 minutes. The heat was then turned off and 269.8 grams of S130 NLP was added.

EXAMPLE 3

Example 3 was carried out in a similar manner to that of Example 2 except that the $C_{24-28}$ olefin succinic anhydride was replaced with an equal molar amount of $C_{24-28}$ olefin lactone acid. The lactone acid was prepared as follows:

About two moles of water were added to one mole of the $C_{24-28}$ alpha-olefin succinic anhydride (same as in Example 1) and mixed with 1 g. of $H_2SO_4$. The reaction mixture was heated to about 130°–140° C. while stirring for about 3–4 hours and then cooled to form the product. The lactone formation was monitored by infrared analysis by the increase in absorption of the 5.6–5.68μ absorption band in the presence of a drop of diethyl amine.

EXAMPLE 4

Example 4 was carried out in the same manner as Example 3 except that $C_{24-28}$ olefin mercapto acetic acid was used in place of the $C_{24-28}$ olefin lactone acid.

The $C_{24-28}$ olefin thioacetic acid was prepared as follows:

One mole $C_{24-28}$ alpha-olefin (Gulftene 24–28 described in Example 1) was dissolved in THF (Tetrahydrofuran) as solvent, and mixed with one mole of mercapto acetic acid. The mixture was heated to about 40° C. and 1 g. of Lucidol-70 (a free radical peroxide type initiator) was added portionwise for a period of ½ hour. Thereafter, the reaction mixture was heated to 70° C. for one hour. The mixture was then cooled to room temperature and added to excess acetone. The precipitated white solid was filtered and collected. The infrared analysis showed to be the desired adduct. It analyzed for a Sap. number of 140.83.

Comparisons B and C

Comparisons B and C were made in the same manner as that of Example 2, 3 and 4, except that the lactone of polyisobutenyl succinic anhydride (PIBSA lactone) and polyisobutenyl succinic anhydride (PIBSA) were used, wherein the polyisobutenyl group had a molecular weight of about 500, i.e. about 36 carbon atoms. The polyisobutenyl succinic anhydride was made in a conventional manner by chlorinating the polyisobutene and then reacting with maleic anhydride.

Concentrates made as shown in Table 2 of the materials prepared according to Examples 2 to 4 and said Comparisons B and C were subjected to the following tests. These concentrates were made up to a viscosity of 650 Centistokes at 100° C.

Sludge Inhibition Bench (SIB) Test

The medium chosen for the SIB Test was a used crankcase mineral lubricating oil composition having an original viscosity of about 325 SUS at 38° C. that had been used in a taxicab that was driven generally for short trips only, thereby causing a buildup of a high concentration of sludge precursors. The oil that was used contained only a refined base mineral lubricating oil, a viscosity index improver, a pour point depressant and zinc dialkyldithiophosphate anti-wear additive. The oil contained no sludge dispersant. A quantity of such used oil was acquired by draining and refilling the taxicab crankcase at 1000–2000 mile intervals.

The Sludge Inhibition Bench Test is conducted in the following manner: The aforesaid used crankcase oil, which is milky brown in color, is freed of sludge by centrifuging for one hour at about 39,000 gravities (gs.). The resulting clear bright red supernatant oil is then decanted from the insoluble sludge particles thereby separated out. However, the supernatant oil still contains oil-soluble sludge precursors which on heating under the conditions employed by this test will tend to form additional oil-insoluble deposits of sludge. The sludge inhibiting properties of the additives being tested are determined by adding to portions of the supernatant used oil, a small amount, such as 0.5, 1 or 2 weight percent, of the particular additive being tested. Ten grams of each blend being tested are placed in a stainless steel centrifuge tube and are heated at 135° C. for 16 hours in the presence of air. Following the heating, the tube containing the oil being tested is cooled and then centrifuged for about 30 minutes at room temperature at about 39,000 gs. Any deposits of new sludge that form in this step are separated from the oil by decanting the supernatant oil and then carefully washing the sludge deposits with 25 ml of heptane to remove all remaining oil from the sludge and further centrifuging. The weight of the new solid sludge that has been formed in the test, in milligrams is determined by drying the residue and weighing it. The results are reported as amount of precipitated sludge in comparison with the precipitated sludge of a blank not containing any additional additive, which blank is normalized to a rating of 10. The less new sludge precipitated in the presence of the additive, the lower the SIB value and the more effective is the additive as a sludge dispersant. In other words, if the additive gives half as much precipitated sludge as the blank, then it would be rated 5.0 since the blank will be normalized to 10.

Varnish Inhibition Bench Test (VIB)

A laboratory test was used to determine varnish inhibition. Here, each test sample consisted of 10 grams of lubricating oil containing a small amount of the additive being tested. The test oil to which the additive is admixed is of the same type as used in the above-described SIB Test. Each ten gram sample was heat soaked overnight at about 140° C. and thereafter centrifuged to remove the sludge. The supernatant fluid of each sample was subjected to heat cycling from about 150° C. to room temperature over a period of 3.5 hours at a frequency of about 2 cycles per minute. During the heating phase, gas which was a mixture of about 0.7 volume percent $SO_2$, 1.4 volume percent NO and balance air was bubbled through the test samples. During the cooling phase water vapor was bubbled through the test samples. At the end of the test period, which testing cycle can be repeated as necessary to determine the inhibiting effect of any additive, the wall surfaces of the test flasks in which the samples were contained are visually evaluated as to the varnish inhibition. The amount of varnish imposed on the walls is rated in values of from 1 to 11 with the higher number being the greater amount of varnish, in comparison with a blank with no additive that was rated 11.

10.00 grams of SIB Test oil were mixed with 0.8 grams of the Concentrates of the Examples and tested in the afore-described SIB and VIB tests.

Haze Test

The haze of blends of 50 wt. % of the Concentrate product of Examples 2 to 4, B and C in 50 wt. % of white mineral lubricating oil were tested in a nephelometer haze meter, namely Nepho-colorimeter Model 9 sold by the Coleman Instrument Corporation of Maywood Ill. In these tests, 0 indicates no haze, while at about a 75 reading, haze begins to become visible to the naked eye.

Storage Stability

The Storage Stability tests were carried out by storing 200 g. of the Concentrate in a pint bottle in an oven at 80° C. and then periodically measuring the (K.V.) kinetic viscosity at 100° C. in terms of Centistokes. The storage stability was calculated as percent increase per hour.

The CCS and K.O. Tests were carried out by mixing 20 wt. % of the Concentrate with 80 wt. % of Enjay 102 mineral lubricating oil to form Blends.

The compositions (in terms of starting material) of the product of Examples 2 to 4 and Comparisons are summarized in the following Table II, along with their properties.

TABLE II

ETHYLENE PROPYLENE COPOLYMER OF 1.4 TE MALEIC ANHYDRIDE GRAFTED TO 0.105 meq./gr.

| | Examples | | | Comparisons | |
|---|---|---|---|---|---|
| | 2 | 3 | 4 | B | C |
| Composition, g. | | | | | |
| EPSA in oil | 800 | 800 | 800 | 800 | 800 |
| $C_{24-28}$ olefin Suc.Anh. | 35.94 | — | — | — | — |
| $C_{24-28}$ olefin lactone acid | — | 35.9 | — | — | — |
| $C_{24-28}$ olefin mercapto acid | — | — | 33.4 | — | — |
| PIBSA 500 | — | — | — | — | 62.4 |
| PIBSA 500 lactone acid | — | — | — | 80.5 | — |
| DETA | 8.6 | 8.6 | 8.6 | 8.6 | 8.6 |
| S130NLP | 267.3 | 267.3 | 269.8 | 222.6 | 240.8 |
| Concentrates | | | | | |
| Example 2 | 76.8 | | | | |
| Example 3 | | 77. | | | |
| Example 4 | | | 81.1 | | |
| Comparison B | | | | 86.8 | |
| Comparison C | | | | | 79.7 |
| S130NLP | 23.2 | 23. | 18.9 | 13.2 | 20.3 |
| Properties | | | | | |
| CCS (−18° C.) | 3916 | 3549 | 4082 | 4082 | 3899 |
| K.O. % | 31.0 | 32.1 | 28.9 | 23.5 | 24.7 |
| Haze | clear | clear | hazy | clear | clear |
| Storage Stability %/hr. viscosity increase, after | | | | | |
| 2 weeks | 0.024 | 0.098 | 0.096 | 0.063 | 0.018 |
| 4 weeks | 0.031 | 0.077 | 0.120 | 0.056 | 0.024 |
| 8 weeks | — | — | — | — | — |
| VIB | 8 | 6 | — | 7 | — |
| SIB | 6.2 | 7.5 | — | 7.2 | — |

Looking at Table II, it is seen that the products of the invention represented by Exampes 2, 3 and 4 had good sludge dispersing, and some varnish inhibition properties. Much lesser weight amounts of the olefin and materials of Examples 2, 3 and 4 gave good overall properties as compared to the larger weight, but equal molar amounts of Comparison B and C. This is readily seen by comparison Example 2 against the corresponding higher mol. wt. PIBSA of Comparison C, and Example 3 against the PIBSA lactone of Comparison B.

What is claimed is:

1. An oil soluble composition useful as a V.I.-dispersant for lubricating oil, comprising the reaction product of:
   (a) an oil soluble ethylene copolymer comprising from about 15 to 90 wt. % ethylene and about 10 to 85 wt. % of one or more $C_3$ to $C_{28}$ alpha-olefin, having a number average molecular weight within a range of about 5,000 to 500,000, and grafted with an ethylenically unsaturated carboxylic acid material having 1 to 2 carboxylic acid groups or anhydride groups;
   (b) from about 1 to 2 mole equivalents per mole of (a) of an alkylene or oxyalkylene amine having at least two primary amine groups; and, (c) from about 0.1 to 4 mole equivalents per mole of (a) of a carboxylic acid of the formula RX where R is an aliphatic hydrocarbyl group of 22 to 28 carbon atoms and X is selected from the group consisting of

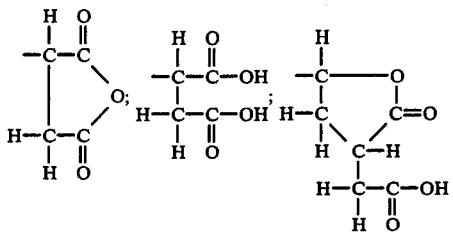

and —S(CH$_2$)$_n$COOH where n is 1 to 3.

2. A reaction product according to claim 1, wherein said (a) comprises a copolymer consisting essentially of about 30 to 80 wt. % ethylene and about 20 to 70 wt. % propylene, having a number average molecular weight in the range of about 10,000 to 200,000 grafted with maleic anhydride.

3. A reaction product according to claim 1, wherein said amine (b) is selected from the group consisting of alkylene polyamines having alkylene groups of about 2 to 7 carbon atoms and 2 to 11 nitrogens, and polyoxyalkylene polyamines, wherein the alkylene groups contain 2 to 7 carbon atoms and the number of oxyalkylene groups will be about 3 to 70.

4. A reaction product according to claim 1, wherein said hydrocarbyl group contains 24 to 28 carbon atoms, and is an alpha mono-olefin moiety.

5. A reaction product according to claim 2, wherein (a) consists essentially of ethylene and propylene grafted with maleic anhydride, wherein about 1 to 2 molar proportions of (b) and about 1 to 4 molar proportions of (c) are reacted per molar proportion of maleic anhydride moiety.

6. A reaction product according to claim 3, wherein said amine is alkylene polyamine of the general formula

wherein x is about 1 to 10 and the alkylene radical is ethylene.

7. A reaction product according to claim 3, wherein said carboxylic acid (c) is

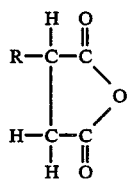

8. A reaction product according to claim 3, wherein said carboxylic acid (c) is represented by the formula:

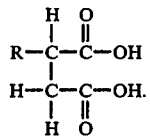

9. A reaction product according to claim 3, wherein said carboxylic acid (c) is represented by the formula:

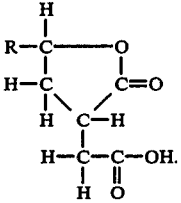

10. A reaction product according to claim 3, wherein said carboxylic acid (c) is represented by the formula:

wherein n is 1 to 3.

11. A reaction product according to claim 1 comprising the reaction product of 5 to 30 weight % of said ethylene copolymer in 95 to 70 weight percent of mineral lubricating oil, free radical grafted with maleic anhydride whereby both said copolymer and some oil have become reacted with maleic anhydride, then reacting with diethylene triamine and said carboxylic acid (c).

12. An oil composition comprising a major proportion of oil selected from the group consisting of lubricating oil and fuel oil and about 0.001 up to 50 wt. % of the oil soluble nitrogen-containing graft ethylene copolymer reaction product of claim 1.

13. An oil composition according to claim 12, which is a lubricating oil composition containing about 0.01 to 15 wt. % of said reaction product.

14. An oil composition according to claim 12, which is an additive concentrate comprising a major amount of lubricating oil and about 5 up to 50 wt. % of said reaction product.

15. A lubricating oil composition comprising a major amount of lubricating oil and a minor amount of the reaction product of claim 7.

16. A lubricating oil composition comprising a major amount of lubricating oil and a minor amount of the reaction product of claim 8.

17. A lubricating oil composition comprising a major amount of lubricating oil and a minor amount of the reaction product of claim 9.

18. A lubricating oil composition comprising a major amount of lubricating oil and a minor amount of the reaction product of claim 10.

19. The composition of claim 1 comprising the reaction product of (1) the graft copolymer of (a), and (2) about 1 to about 2 moles per mole of (a) of the reaction product of from about 0.5 to about 3.3 molar proportions of the polyamine of (b) per mole of the carboxylic acid of (c).

* * * * *